M. H. Sullivan,
Horse Gag.
Nº 78,155. Patented May 19 1868.
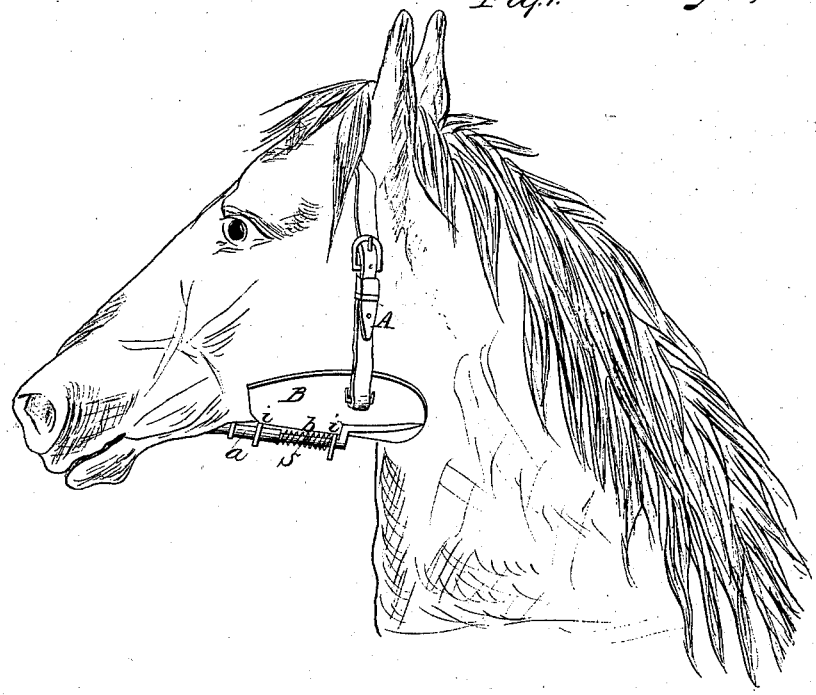
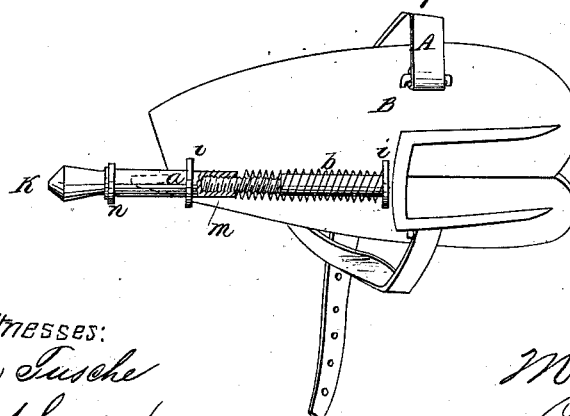
Witnesses:
Theo Tusche
J. A. Service
Inventor:
M H Sullivan
Per Munn & Co
Attorneys

United States Patent Office.

MICHAEL H. SULLIVAN, OF PROVIDENCE, RHODE ISLAND.

*Letters Patent No. 78,155, dated May 19, 1868.*

IMPROVED CRIBBING-PREVENTER.

*The Schedule referred to in these Letters Patent and making part of the same.*

TO ALL WHOM IT MAY CONCERN:

Be it known that I, MICHAEL H. SULLIVAN, of Providence, in the county of Providence, and State of Rhode Island, have invented a new and improved Cribbing-Preventer; and I do hereby declare that the following is a full, clear, and exact description thereof, which will enable those skilled in the art to make and use the same, reference being had to the accompanying drawings, forming part of this specification, in which—

Figure 1 is a perspective view of the preventer when attached to the animal.

Figure 2 is a perspective detail of the same.

Similar letters of reference indicate corresponding parts.

This invention relates to an improvement for preventing and breaking horses from cribbing.

It consists of an angular or curved plate, B, of metal or other suitable material, covered with leather.

Attached to the plate is a strap, A, for buckling around the horse's head in front of the ears, as shown.

Secured to the plate are two eyes or collars $i$ $i'$.

$b$ is a shank, having sufficient longitudinal motion within the collars $i$ $i'$ to present the pricking-points $g$ $g$, which are attached to and form a part of it, beyond the edge of the plate B.

Coiled around the shank $b$ is a helical spring, $s$, which may be substituted by a rubber sleeve to serve a similar purpose, which is the retiring of the points $g$ $g$ to the position shown in the drawing, when the force is removed that thrusts them beyond the said edge of the plate B.

A screw, $m$, is formed on the shank $b$, the object of which is to receive a hollow spindle, $a$, formed with a corresponding hollow screw, as shown in fig. 2.

The tension of the spring $s$ is exerted against the collar $i$ and the end of the spindle $a$, whereby the pricking-points $g$ $g$ are kept withdrawn in the manner before described.

The spindle moves freely within the collar $i'$, and is provided with a shoulder or flange, $n$, for limiting its longitudinal motion, so that, when the said flange comes in contact with the collar $i'$ the pricking-points $g$ $g$ can be projected no farther.

By screwing or unscrewing this spring, the points $g$ $g$ are adjusted so as to produce less or greater pricking-action, and if none is required, as may be the case at times, this action can be altogether prevented, by screwing up the spindle until its flange $n$ touches or nearly touches the said collar $i'$, as before stated.

This cribbing-preventer, when attached in the angle formed by the head and neck of a horse, as shown in the drawing, will prevent and ultimately break the animal from the vice of cribbing, for when bending to seize the trough, manger, hitching-post, or neck-yoke, the head is flexed back against the neck, and the end, $k$, of the spindle, impinging against the jaw, thrusts the pricking-points into the neck, causing the animal to desist.

Being adjustable, as before shown, the improvement can be applied to horses more or less addicted to the practice, for, while those with which this vice has become habitual require to feel the points severely, young horses, and those just acquiring the habit, are better managed in this particular with a very slight or no pricking.

Some animals being very sensitive, the presence of the plate and strap alone is sufficient, from the unusual sensation produced by the same, to deter them from persisting in the vice.

Those devices for this purpose heretofore made consisted of rude points rigidly attached to a strap or collar, thus rendering them unadjustable, and liable to inflict dangerous wounds on the animal.

This objection is removed in my invention, which has, in addition, the advantages of simplicity, general adaptability, and moderate expense.

Having thus described my invention, I claim as new, and desire to secure by Letters Patent—

1. The combination of the pricking-points $g$, screw-shank $b$, hollow spindle $a$, spring $s$, and plate B, substantially as described, for the purpose specified.

2. The plate B, in combination with the longitudinally-sliding pricking-points $g$, substantially as and for the purpose shown and described.

MICHAEL H. SULLIVAN.

Witnesses:
C. B. THOMPSON,
ALEX. F. ROBERTS.